United States Patent

Peng et al.

(10) Patent No.: US 9,159,349 B2
(45) Date of Patent: Oct. 13, 2015

(54) WRITER CORE INCORPORATING THERMAL SENSOR HAVING A TEMPERATURE COEFFICIENT OF RESISTANCE

(71) Applicant: Seagate Technology LLC, Cupertino, CA (US)

(72) Inventors: Peng Peng, Eden Prairie, MN (US); Declan Macken, Prior Lake, MN (US); Michael Thomas Johnson, Minneapolis, MN (US); Zheying Guo, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/012,480

(22) Filed: Aug. 28, 2013

(65) Prior Publication Data

US 2015/0062754 A1    Mar. 5, 2015

(51) Int. Cl.
*G11B 5/60* (2006.01)

(52) U.S. Cl.
CPC .............. *G11B 5/6076* (2013.01); *G11B 5/607* (2013.01)

(58) Field of Classification Search
CPC .... G11B 5/255; G11B 5/3136; G11B 5/3106; G11B 5/6076; G11B 5/607
USPC ................ 360/125.17, 125.3, 125.31, 125.74
See application file for complete search history.

(56) References Cited

U.S. PATENT DOCUMENTS

| | | | |
|---|---|---|---|
| 7,099,121 B2 | 8/2006 | Parker et al. | |
| 7,149,055 B2 | 12/2006 | Clinton et al. | |
| 7,212,367 B2 | 5/2007 | Clinton et al. | |
| 7,362,530 B2 | 4/2008 | Hashizume | |
| 7,372,665 B1 | 5/2008 | Stoev et al. | |
| 7,589,928 B2 * | 9/2009 | Roy et al. | 360/75 |
| 7,679,863 B2 | 3/2010 | Hashimoto et al. | |
| 7,808,746 B2 | 10/2010 | Burbank et al. | |
| 7,862,912 B2 | 1/2011 | Hellwig et al. | |
| 7,869,309 B2 | 1/2011 | Mihalcea et al. | |
| 8,077,417 B2 | 12/2011 | Mallary et al. | |
| 8,107,180 B2 | 1/2012 | Nishida et al. | |
| 8,213,117 B2 * | 7/2012 | Antoku et al. | 360/125.31 |
| 8,289,821 B1 | 10/2012 | Huber | |
| 8,351,157 B2 * | 1/2013 | Nishioka et al. | 360/125.31 |
| 8,477,455 B2 * | 7/2013 | Furukawa et al. | 360/234.4 |
| 8,498,080 B2 * | 7/2013 | Sasaki et al. | 360/125.31 |

(Continued)

OTHER PUBLICATIONS

File History for U.S. Appl. No. 13/365,942 as retrieved from the U.S. Patent and Trademark Office on Aug. 7, 2013, 96 pages.

(Continued)

*Primary Examiner* — Angel Castro
(74) *Attorney, Agent, or Firm* — Hollingsworth Davis, LLC

(57) ABSTRACT

A writer core of a transducer is configured to interact with a magnetic recording medium and comprises an upper core and a lower core. At least one of the upper and lower cores comprises a return pole having a return shield. The apparatus also comprises a writer pole between the upper and lower cores, and a writer gap defined between the writer pole and the return shield. The apparatus further comprises a sensor element within one of the upper and lower cores that includes the writer gap. The sensor element has a temperature coefficient of resistance and is configured to sense for a change in temperature indicative of one or both of a change in spacing and contact between the transducer and the magnetic recording medium.

17 Claims, 8 Drawing Sheets

(56) References Cited

U.S. PATENT DOCUMENTS

| | | | |
|---|---|---|---|
| 8,643,981 B2* | 2/2014 | Natori | 360/234.4 |
| 8,705,323 B2* | 4/2014 | Contreras et al. | 369/13.32 |
| 8,749,920 B1* | 6/2014 | Knutson et al. | 360/125.31 |
| 8,792,311 B2* | 7/2014 | Zheng et al. | 369/13.33 |
| 8,837,089 B1* | 9/2014 | Sasaki et al. | 360/125.31 |
| 8,854,764 B2* | 10/2014 | Chiu et al. | 360/75 |
| 2003/0058559 A1* | 3/2003 | Brand et al. | 360/31 |
| 2004/0169950 A1 | 9/2004 | Clinton et al. | |
| 2005/0280935 A1 | 12/2005 | Clinton et al. | |
| 2005/0289577 A1 | 12/2005 | Seigler et al. | |
| 2006/0007594 A1* | 1/2006 | Umehara et al. | 360/126 |
| 2006/0132971 A1 | 6/2006 | Clinton et al. | |
| 2007/0036040 A1 | 2/2007 | Mihalcea et al. | |
| 2008/0112087 A1 | 5/2008 | Clinton et al. | |
| 2009/0158305 A1 | 6/2009 | Seigler et al. | |
| 2009/0226762 A1 | 9/2009 | Hellwig et al. | |
| 2009/0237837 A1 | 9/2009 | Amin et al. | |
| 2010/0149675 A1 | 6/2010 | Mallary et al. | |
| 2011/0030109 A1 | 2/2011 | Saito | |
| 2011/0242694 A1 | 10/2011 | Taguchi | |
| 2012/0051196 A1 | 3/2012 | Grobis et al. | |
| 2012/0120519 A1 | 5/2012 | Kunkel et al. | |
| 2012/0120522 A1 | 5/2012 | Johnson et al. | |
| 2012/0120527 A1 | 5/2012 | Kunkel et al. | |
| 2012/0120982 A1 | 5/2012 | Anaya-Dufresne et al. | |
| 2012/0201108 A1 | 8/2012 | Zheng et al. | |
| 2012/0314325 A1 | 12/2012 | Wessel et al. | |
| 2012/0327529 A1 | 12/2012 | Hutchinson et al. | |
| 2013/0201577 A1 | 8/2013 | Lopusnik et al. | |

OTHER PUBLICATIONS

U.S. Appl. No. 13/961,672, filed Aug. 7, 2013, Benakli et al.

\* cited by examiner

WRITER CORE INCORPORATING THERMAL SENSOR HAVING A TEMPERATURE COEFFICIENT OF RESISTANCE

SUMMARY

Embodiments of the disclosure are directed to an apparatus comprising a writer core of a transducer configured to interact with a magnetic recording medium and comprising an upper core and a lower core. At least one of the upper and lower cores comprises a return pole having a return shield. The apparatus also comprises a writer pole between the upper and lower cores, and a writer gap defined between the writer pole and the return shield. The apparatus further comprises a sensor element within one of the upper and lower cores that includes the writer gap. The sensor element has a temperature coefficient of resistance and is configured to sense for a change in temperature indicative of one or both of a change in spacing and contact between the transducer and the magnetic recording medium.

Other embodiments are directed to an apparatus comprising a writer core of a transducer configured to interact with a magnetic recording medium and comprising an upper core and a lower core. At least one of the upper and lower cores comprises a return pole having a return shield. The apparatus also comprise a writer pole between the upper and lower cores, and a writer gap defined between the writer pole and the return shield. The apparatus further comprises a sensor element within one of the upper and lower cores that includes the writer gap. The sensor element has a temperature coefficient of resistance and is configured to sense for a change in temperature indicative of one or both of a change in spacing and contact between the transducer and the magnetic recording medium, and to enhance a gradient of a magnetic field generated by the write core.

Further embodiments are directed to a method involving sensing a temperature at or near a return shield of a writer core of a transducer, measuring a change in the sensed temperature indicative of a change in spacing or contact between the transducer and an magnetic recording medium, and performing a predetermined action in response to the measured temperature change. In some embodiments, the predetermined action comprises declaring a contact event between the transducer and the medium. Other embodiments involve sensing the temperature at or near the return shield using a thermal sensor and enhancing a gradient of a magnetic field produced by the writer core using a magnetic field produced by the thermal sensor.

These and other features and aspects of various embodiments may be understood in view of the following detailed discussion and accompanying drawings.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Data storage systems commonly include one or more recording heads that write and read information to and from a recording medium. A relatively small distance or spacing is maintained between a recording head and its associated media. This distance or spacing is known as "fly height" or "head-media spacing." By reducing the head-media spacing, a recording head is typically better able to both write and read data to and from a medium. Reducing the head-media spacing also allows for surveying of recording medium topography, such as for detecting asperities, voids, and other features of the recording medium surface. Head-media contact detection and/or head-media spacing sensing technologies are important for the performance and reliability of magnetic storage systems. Higher contact detection repeatability enables lower active clearance, and thus higher recording density. Higher contact detection sensitivity reduces wear and improves reliability.

Figure 1:
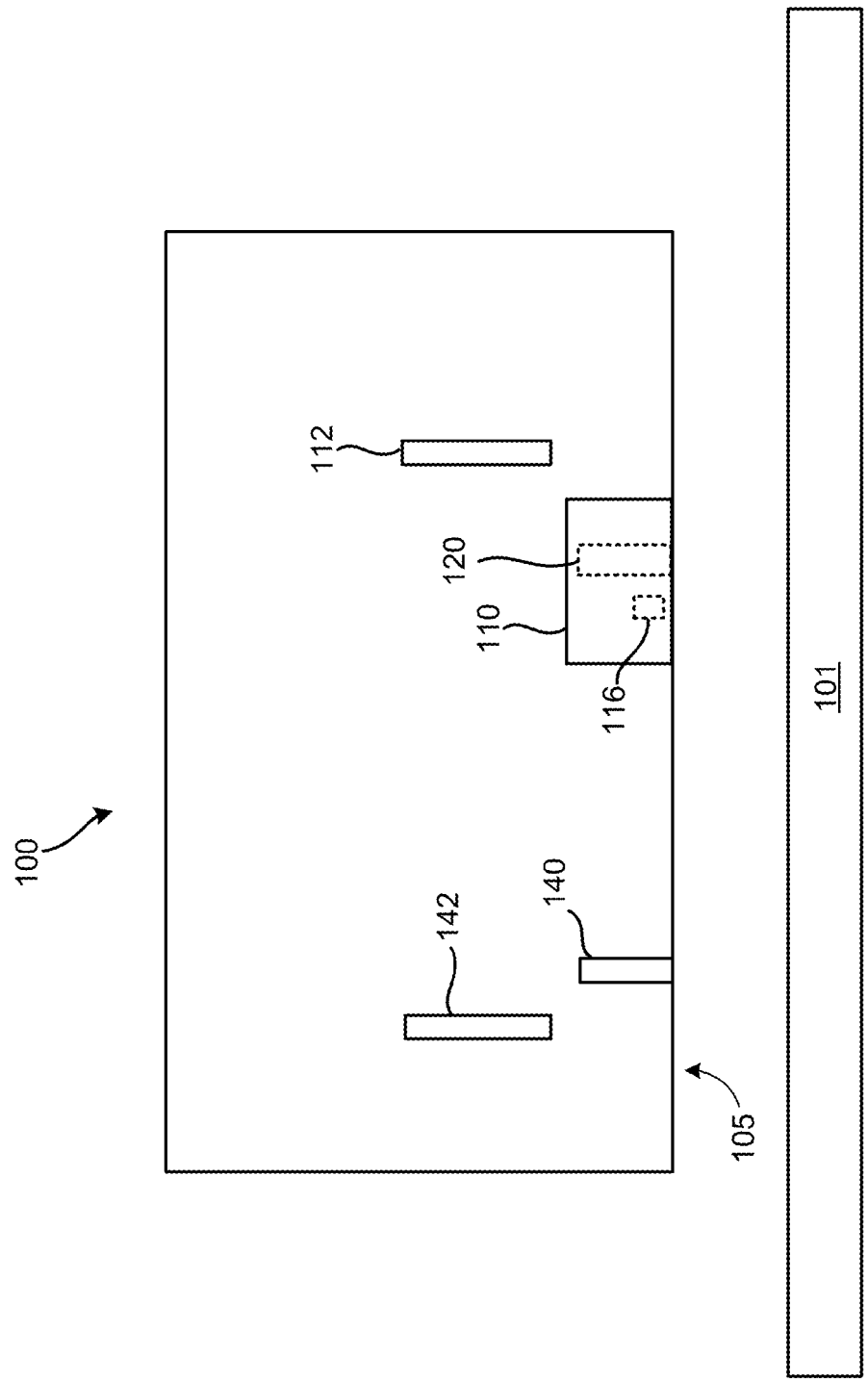
FIG. 1 is a simplified illustration of a recording transducer shown in close proximity to a rotating magnetic storage medium in accordance with various embodiments.

In accordance with various embodiments, and with reference to FIG. 1, a recording transducer 100 is shown in close proximity to a rotating magnetic storage medium 101. The recording transducer 100 includes a number of components, including a writer 110, a writer heater 112 thermally coupled to the writer 110, a reader 140, and a reader heater 142 thermally coupled to the reader 140. The writer 110 and reader 140 are positioned at or near an air bearing surface (ABS) 105 of the transducer 100. The heaters 112 and 142 may be resistive heaters that generate heat in response to passage of electrical current. The thermal energy generated by the heaters 112 and 142 causes thermal expansion of the transducer 100, largely expressed at the ABS 105. In particular, actuation of the writer heater 112 causes thermal expansion of the writer region of the transducer 100, resulting in reduced spacing between the writer 110 and the magnetic recording medium 101. Similarly, actuation of the reader heater 142 causes thermal expansion of the reader region of the transducer 100, resulting in reduced spacing between the reader 140 and the magnetic recording medium 101. Selectively actuating the writer and reader heaters 112 and 142 allows for control of the head-media spacing in a data storage system.

Providing robust contact detection at the writer region of the transducer 100 can be challenging, particularly in conventional transducer designs that employ thermal actuation of the writer and a contact sensor located remotely from the writer pole. In general, it is difficult or impossible to place a contact sensor next to the writer pole in a conventional design due to the complicated writer structure. Touchdown signals from a conventional contact sensor become even weaker for non-modulating or low-clearance air bearing designs.

Embodiments of the disclosure are directed to a magnetic writer that incorporates a thermal sensor within the writer core in close proximity to the writer pole of the magnetic writer. Some embodiments are directed to a magnetic writer that incorporates a thermal sensor near a shield of the magnetic writer proximate the writer pole. Other embodiments are directed to a magnetic writer that incorporates a thermal sensor integral to (within, inside of, embedded in or otherwise physically connected to) a shield of the magnetic writer proximate the writer pole. By utilizing the AC or DC component of the resistive change of the thermal sensor, writer spacing changes and touchdowns, particularly for a thermally actuated writer, can be declared with an improved contact signal-to-noise ratio and accuracy.

Further embodiments are directed to a magnetic writer that incorporates a multifunctional thermal sensor at or within a writer core of the magnetic writer. In one mode of operation, for example, the multifunctional thermal sensor serves to sense changes in head-media spacing and contact events. In a second mode of operation, the multifunctional thermal sensor serves to enhance or optimize the magnetic field gradient during a writing event. For example, the multifunctional thermal sensor serves to synchronize the magnetic response of the writer pole and return shield when writing data to a magnetic recording medium. Various embodiments are directed to head-media spacing and contact detection apparatuses and methods for use with modulating air bearings. Other embodiments are directed to head-media spacing and contact detection apparatuses and methods for use with air bearings with low head-media spacing modulation or head-disk interfaces with stiff air bearings.

According to various embodiments, the writer 110 incorporates a thermal sensor 116 positioned in close proximity to a writer pole 120. In some embodiments, the thermal sensor 116 is incorporated within the writer core of the writer 110, such as near or within a shield of the writer 110. In other embodiments, the thermal sensor 116 is incorporated within the portion of the writer core that includes a write gap defined between the writer pole 120 and a return shield of the writer 110. Placement of the thermal sensor 116 within the writer core and in close proximity to the writer pole 120 allows for temperature sensing at the close point defined between the writer 110 and the magnetic recording medium 101 (i.e., the writer close point). Temperature sensing at the writer close point also provides for sensing of changes in head-media spacing and contact events at the writer region of the transducer 100.

In accordance with some embodiments, such as that illustrated in FIG. 8 and discussed in detail hereinbelow, a thermal sensor may be positioned proximate the reader 140. Positioning a thermal sensor near the reader 140 allows for temperature sensing at a close point defined between the reader 140 and the magnetic recording medium 101. Temperature sensing at the reader close point provides for sensing of changes in head-medium spacing and contact events at the reader region of the transducer 100. It is understood that some embodiments of the transducer 100 incorporate thermal sensing only at the writer, while other embodiments incorporate thermal sensing at the writer and other locations of the transducer, such as the reader 140 and/or a location away from the ABS 105 (e.g., a reference thermal sensor).

According to various embodiments, the thermal sensor 116 is configured to sense changes in heat flow for detecting head-media spacing changes and contact and, in some embodiments, asperities of the medium 101. For example, bias power can be applied to the thermal sensor 116 to raise the surface temperature of the sensor and an adjacent portion of the transducer 100 to be substantially higher than the temperature of the magnetic recording medium 101. An air gap is defined between the hot transducer surface and the relatively cool magnetic recording medium 101. The transducer 100, air gap, and magnetic recording medium 101 define one level of heat transfer rate. When the transducer 100 is in contact with the recording medium 101, such as after activation of one or both of the thermal heaters 112, 142, the direct contact between the high thermal conductivity materials of the transducer 100 and the recording medium 101 significantly increases the heat transfer rate. As such, the thermal sensor 116 senses a drop of temperature or an excursion of temperature trajectory, allowing for detection of head-media contact.

According to a representative example, the temperature profile of the transducer 100 can be represented as a steady state DC signal generated by the thermal sensor 116. In some embodiments, the temperature profile of the transducer 100 can be represented as an AC signal generated by the thermal sensor 116, such as in response to modulation of head-media spacing for example. When the transducer 100 is actuated by one or both of thermal actuators 112 and 142, the transducer surface temperature will increase with the actuation due to the generated heat. The transducer temperature will be higher than the temperature of the recording medium 101. As such, the recording medium 101 acts as a heat sink in this scenario. When the transducer 100 contacts the recording medium 101, the transducer surface temperature will drop due to a change in heat transfer rate resulting from the contact. The transducer surface temperature will continue to increase due to thermal actuator heating and frictional heating. The change in temperature or excursion in temperature trajectory can be used to declare head-media contact.

According to various embodiments, the thermal sensor 116 of the writer 110 is configured as a resistance thermal sensor. A resistance thermal sensor is essentially a thermal sensitive resistor on a pole tip. A resistance thermal sensor measures the temperature change induced by all thermal condition changes from air pressure, clearance, and contact, among other changes. For the air bearing 105 of transducer 100 shown in FIG. 1, for example, transducer cooling efficiency improves with reduced clearance to the medium 101 due to an increase in thermal transport efficiency. Transducer cooling efficiency reaches a maximum when the transducer 100 contacts the medium 101 because the medium 101 provides an efficient thermal sink to the transducer 100.

Although the thermal sensor 116 can be implemented using different technologies, the thermal sensor 116 is described herein as a resistance thermal sensors composed of materials having a temperature coefficient of resistance (TCR) according to various embodiments. Other types of thermal sensors can be employed, such as a varistor or a thermocouple, for example. One example of a TCR sensor is a dual-ended temperature coefficient of resistance sensor (DETCR), in which each end is coupled to a bias source (e.g., bond pad of the transducer). Another example of a TCR sensor is a ground-split (GS) temperature coefficient of resistance sensor, in which one end of the GSTCR is coupled to ground and the other is coupled to a bias source. A TCR sensor measures temperature change by measuring the change in resistance, or rate of change in resistance, across the sensor. The thermal sensor 116 situated near or at the ABS 105 are configured to measure the temperature change at ABS 105 induced by all thermal condition changes from air pressure, clearance, head operation, and contact, among other changes.

Figure 2:
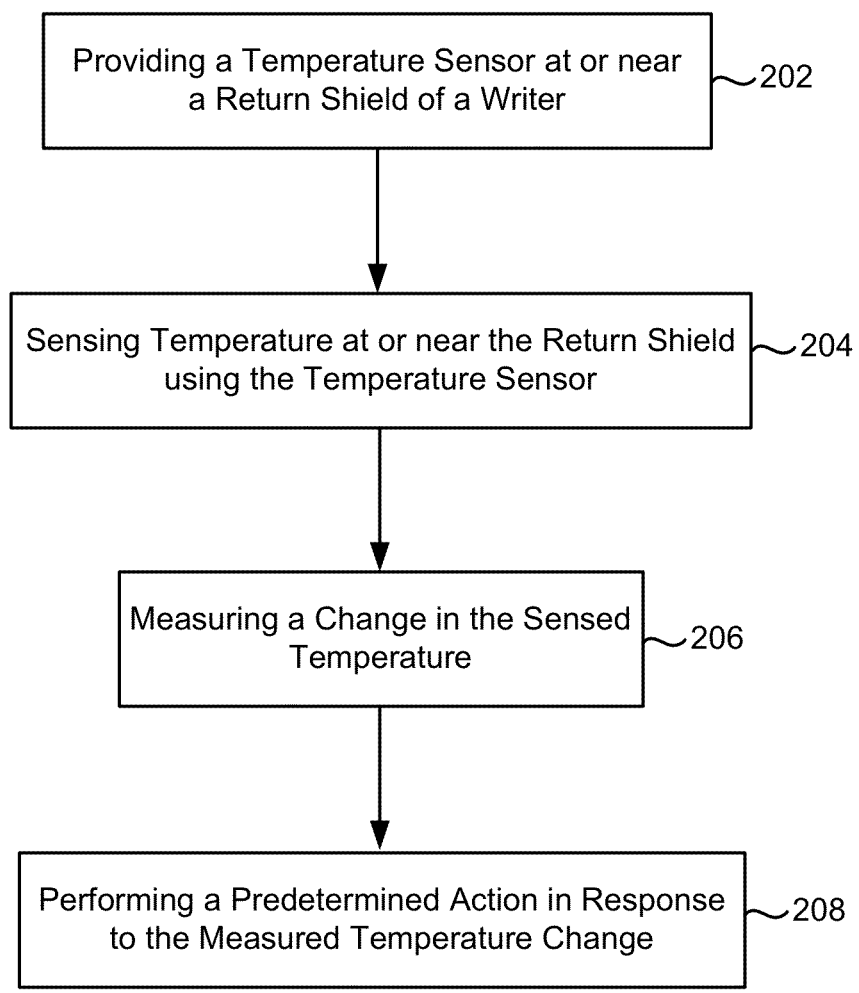
FIGS. 2 and 3 are flow diagrams illustrating methods of detecting head-medium contact in accordance with various embodiments.

According to various embodiments, and with reference to FIG. 2, methods of the disclosure involve provision of a temperature sensor at or near a shield of a writer. Some embodiments involve providing a temperature sensor at or near a return shield of a return pole of the writer. Other embodiments involve providing a temperature sensor within a section of a writer core of the writer which includes a write gap. The method according to FIG. 2 further involves sensing 204 temperature at or near the shield using the temperature sensor. The method also involves measuring 206 a change in the sensed temperature. The measured temperature change 206 may be used to perform a variety of functions or predetermined actions 208.

Figure 3:
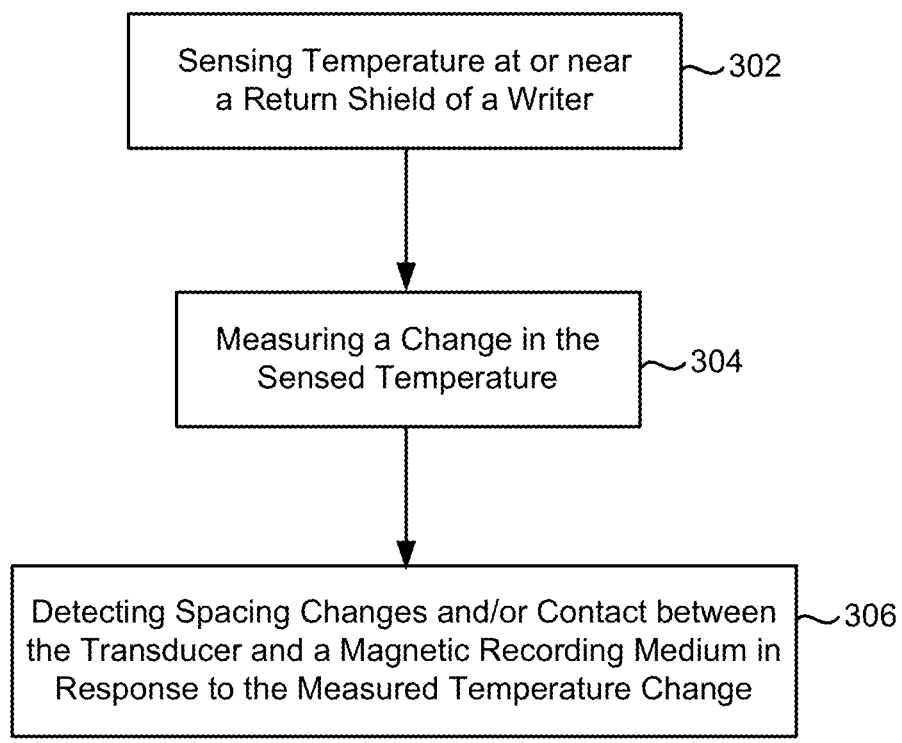

FIG. 3 is a flow chart showing various processes involving detection of contact between a transducer and a magnetic recording medium in accordance with various embodiments. The method shown in FIG. 3 involves sensing 302 temperature at or near a return shield of a writer using a temperature sensor. The method also involves measuring 304 a change in the sensed temperature, and detecting 306 spacing changes and/or contact between the transducer and the magnetic recording medium in response to the measured temperature change.

Figure 4:
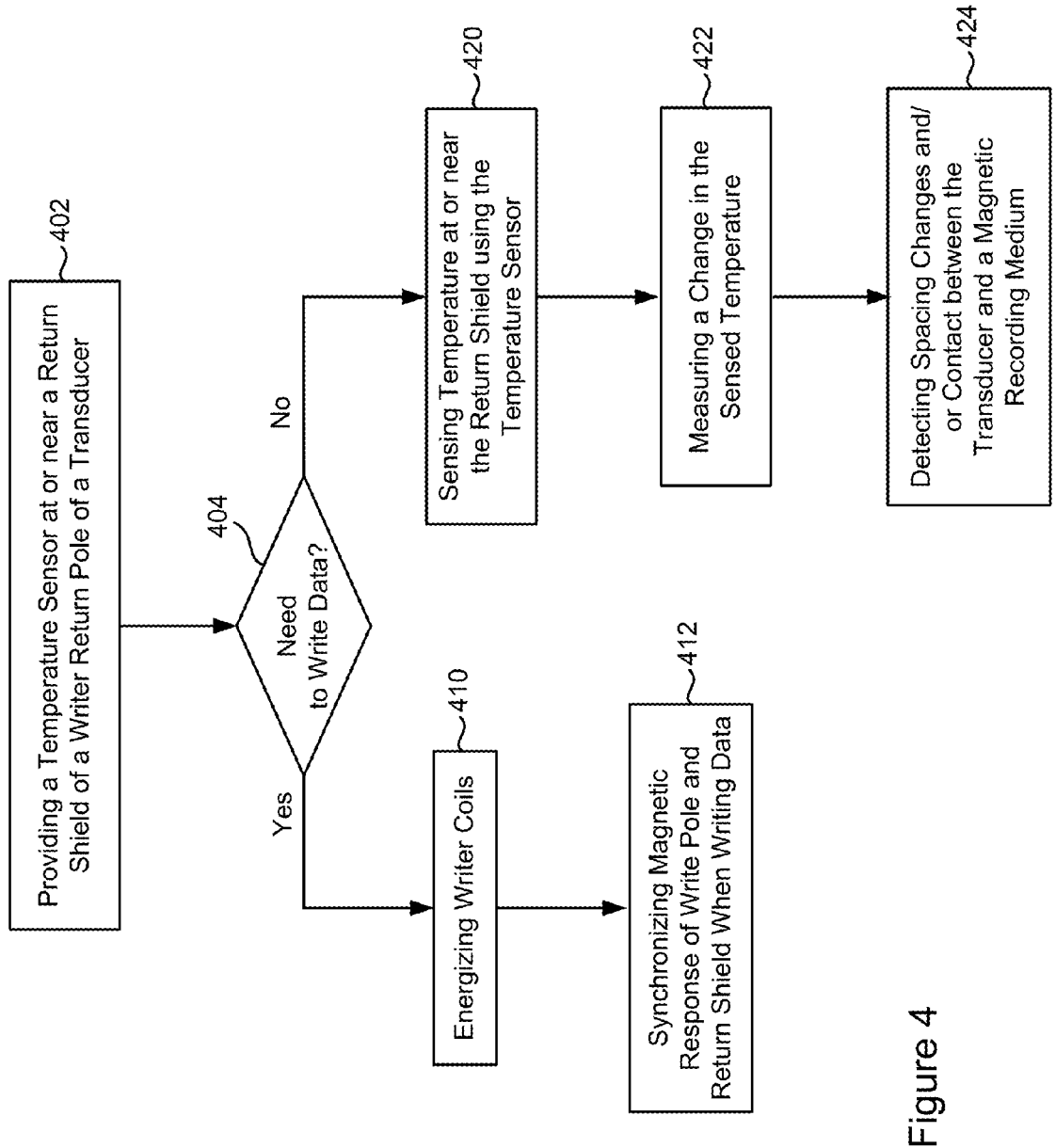
FIG. 4 is a flow diagram illustrating a method of using a thermal sensor for both detecting head-medium contact and synchronizing the magnetic response of a writer pole and shield(s) when writing data to a magnetic recording medium in accordance with various embodiments.

In accordance with other embodiments, and with reference to FIG. 4, methods of the disclosure involve providing 402 a thermal sensor at or near a return shield of a writer return pole of a transducer. Various operations can be performed depending on whether or not data needs to be written to a magnetic recording medium proximate the transducer. During a time in which data needs to be written 404 to the magnetic recording medium, the thermal sensor is used to enhance the data writing process. According to some embodiments, after energizing 410 the coils of the writer, writing data to the magnetic recording medium involves synchronizing 412 the magnetic response of the writer pole and the return shield(s) when writing data to the magnetic recording medium. For example, a control circuit (see FIG. 8, for example) can be configured to actively synchronize magnetic response of the writer pole and the return shield(s) during write operations, so as to enhance or optimize the magnetic write field gradient and mitigate side track erasure. Synchronizing the writer pole in this manner and establishing a flux circuit with the shield(s) closing the flux circuit enhances write accuracy, ensuring that a supplied magnetic write field will achieve a fast and sharp transition between two bits. It is noted that using the thermal sensor to facilitate synchronizing of the magnetic response of the write pole and the return shield(s) during write operations involves passing a relatively large current through the thermal sensor (e.g., about 20 mA to about 100 mA, DC or AC).

During a period of time in which data does not have to be written 404 to the magnetic recording medium, the thermal sensor can be used for a variety of functions, such as sensing head-medium separation and head-medium contact, determining fly height and adjusting same, and detecting asperities, avoids, and other topological features of the magnetic recording medium. Other functions that can be performed using the thermal sensor include sensing a change in modulation of the flying transducer or slider and measuring a change in thermal conductivities. According to the representative embodiment shown in FIG. 4, operations performed during a period in which data writing is not needed involves sensing 420 temperature at or near a return shield using the temperature sensor, measuring 422 a change in the sensed temperature, and detecting 424 spacing changes and/or contact between the transducer and the magnetic recording medium. It is noted that using the thermal sensor to facilitate various sensing and measuring operations during periods not involving data write operations involves passing a relatively small current through the thermal sensor as compared to current supplied during write operations (e.g., about 0.1 mA to about 25 mA).

Figure 5:
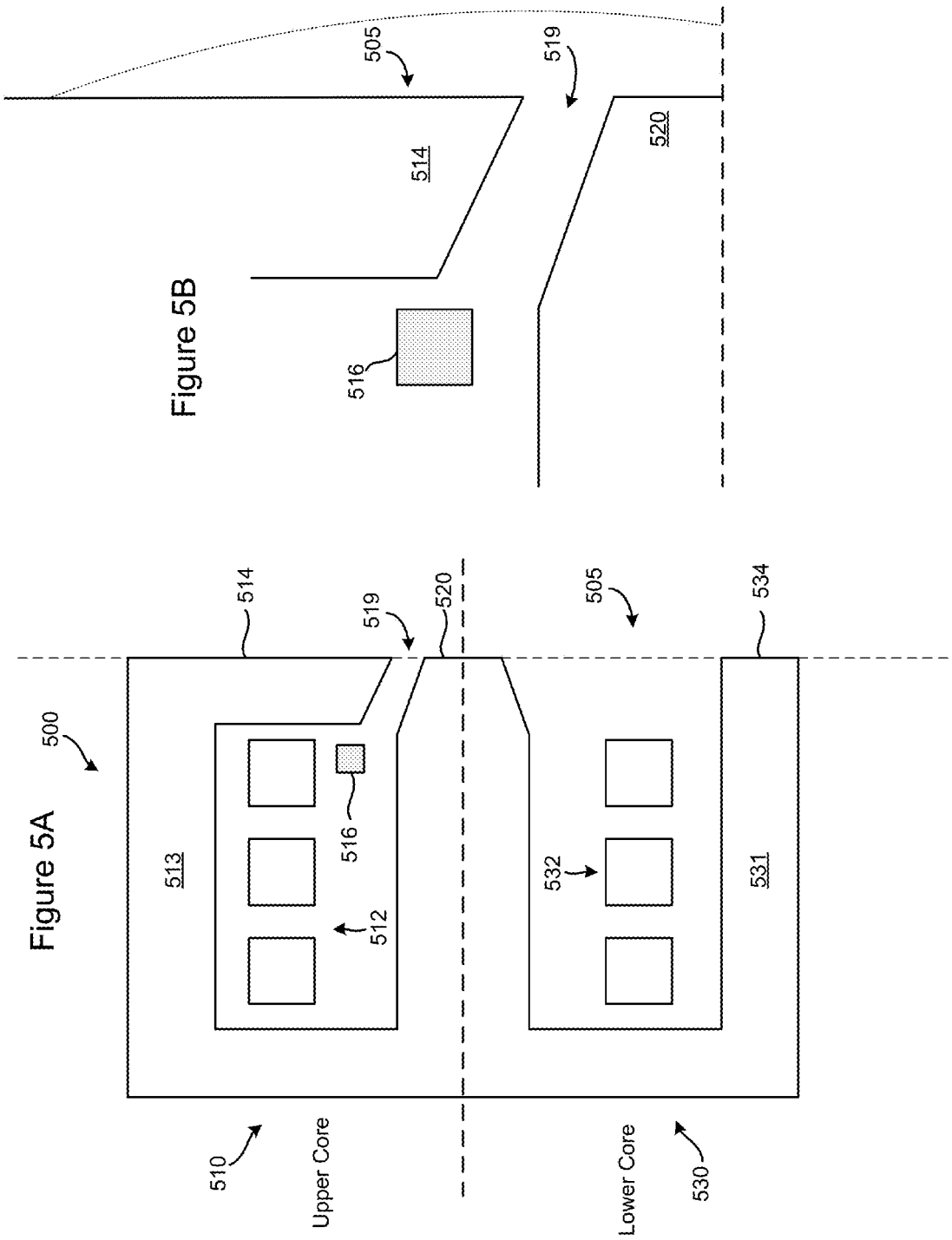
FIG. 5A is a sectional view of a writer core of a transducer that incorporates a thermal sensor in accordance with various embodiments.
FIG. 5B is an exploded sectional view of an upper writer core portion of a transducer that incorporates a thermal sensor in accordance with various embodiments.

FIG. 5A is a sectional view of a writer core 500 which incorporates a thermal sensor in accordance with various embodiments. According to the embodiment shown in FIG. 5A, the writer core 500 is a component of a transducer configured to interact with a magnetic recording medium. The writer core 500 includes an upper core portion 510 comprising coils 512 and a lower core portion 530 comprising coils 532. The upper core 510 includes a writer return pole 513, and the lower core 530 includes a writer return pole 531. The writer return pole 513 includes an upper return shield 514, and the writer return pole 531 includes a lower return shield 534. In some embodiments, the upper core 510 is situated closer to the trailing edge of the transducer than the lower core 530.

A writer pole 520 is shown situated between the upper and lower cores 510 and 530. For purposes of explanation, a dotted line (extending horizontally across FIG. 5A) is shown passing through an axis of the writer pole 520, which demarcates the upper core 510 from the lower core 530. A vertically oriented dotted line in FIG. 5A indicates the location of the air bearing surface 505 of the transducer on which the writer core 500 resides.

The upper core 510 includes a writer gap 519 defined between a distal end of the return shield 514 and the writer pole 520. In the embodiment shown in FIG. 5A, a thermal sensor 516 is situated within the upper core 510 of the writer core 500. As shown in FIGS. 5A and 5B, the thermal sensor 516 is situated adjacent the return shield 514 near the writer pole 520. Although spaced apart from the return shield 514 in this embodiment, the thermal sensor 516 is sufficiently close to the return shield 514 such that the temperature and changes in temperature experienced by the thermal sensor 516 are the same or substantially the same (e.g., to within about 0.1° C. to about 10° C.) as that experienced by the return shield 514. In particular, in the embodiment shown in FIG. 5B, the thermal sensor 516 is situated adjacent a distal end of the return shield 514 proximate the gap 519. Because the return shield 514 is situated at or near the ABS 505 and at or near the writer close point, the temperature and temperature changes of the thermal sensor 516 are the same or substantially the same as that experienced by the return shield 514 and the writer close point.

According to various embodiments, the thermal sensor 516 is situated within the upper core 510 of the writer core 500 and spaced apart from the writer pole 520 by less than about 500 nm (e.g., about 1 nm to about 500 nm). In various other embodiments, the thermal sensor 516 is situated within the upper core 510 of the writer core 500 and spaced apart from the writer pole 520 by less than about 400 nm, 300 nm, 200 nm, 100 nm, and 50 nm, respectively. For example, and according to various embodiments, the thermal sensor 516 is situated within the upper core 510 of the writer core 500 and spaced apart from the writer pole 520 by between about 20 and 500 nm. In some embodiments, for example, the thermal sensor 516 is situated about 200 to 300 nm from the writer pole 520. In other embodiments, the thermal sensor 516 is situated about 100 to 200 nm from the writer pole 520. In further embodiments, the thermal sensor 516 is situated about 50 to 100 nm from the writer pole 520. In yet other embodiments, the thermal sensor 516 is situated about 20 to 50 nm from the writer pole 520.

In accordance with various embodiments, the thermal sensor 516 is spaced apart from the return shield 514 by at least about one nanometer. For example, and as best seen in FIG. 5B, the thermal sensor 516 may be spaced away from the return shield 514 by about 1 to 20 nm, such as between about 2 and 10 nm. The thermal sensor 516, as discussed previously, may be configured from materials having a temperature coefficient of resistance, such as Pt, Ru, Ni, and NiFe, for example.

Figure 6:
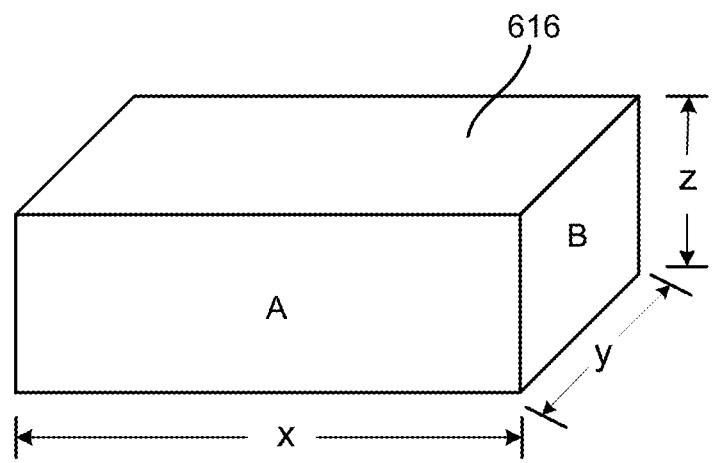
FIG. 6 shows a portion of a thermal sensor which can be incorporated within a writer core of a transducer in accordance with various embodiments.

FIG. 6 illustrates a thermal sensor 616 of the type described previously in FIGS. 1 through 5. According to various embodiments, the thermal sensor 616 can be fabricated as a wire formed of one or more materials having a relatively high TCR. As generally shown in the figures, the thermal sensor 616 can have a square or rectangular cross-sectional shape, although other cross-sectional shapes are contemplated including other polygonal and curved shapes. In FIG. 6, the thermal sensor 616 has a thickness, z, a depth, y, and a width, x. According to some embodiments, the thermal sensor 616 can have a thickness of about 35 nm, a depth of about 200 to 400 nm, and a width of about 1.5 to 3 μm. It will be appreciated that the thickness, depth, and width (or other dimensions) of the thermal sensor 616 will vary depending on the particulars of the writer core design.

Figure 7:
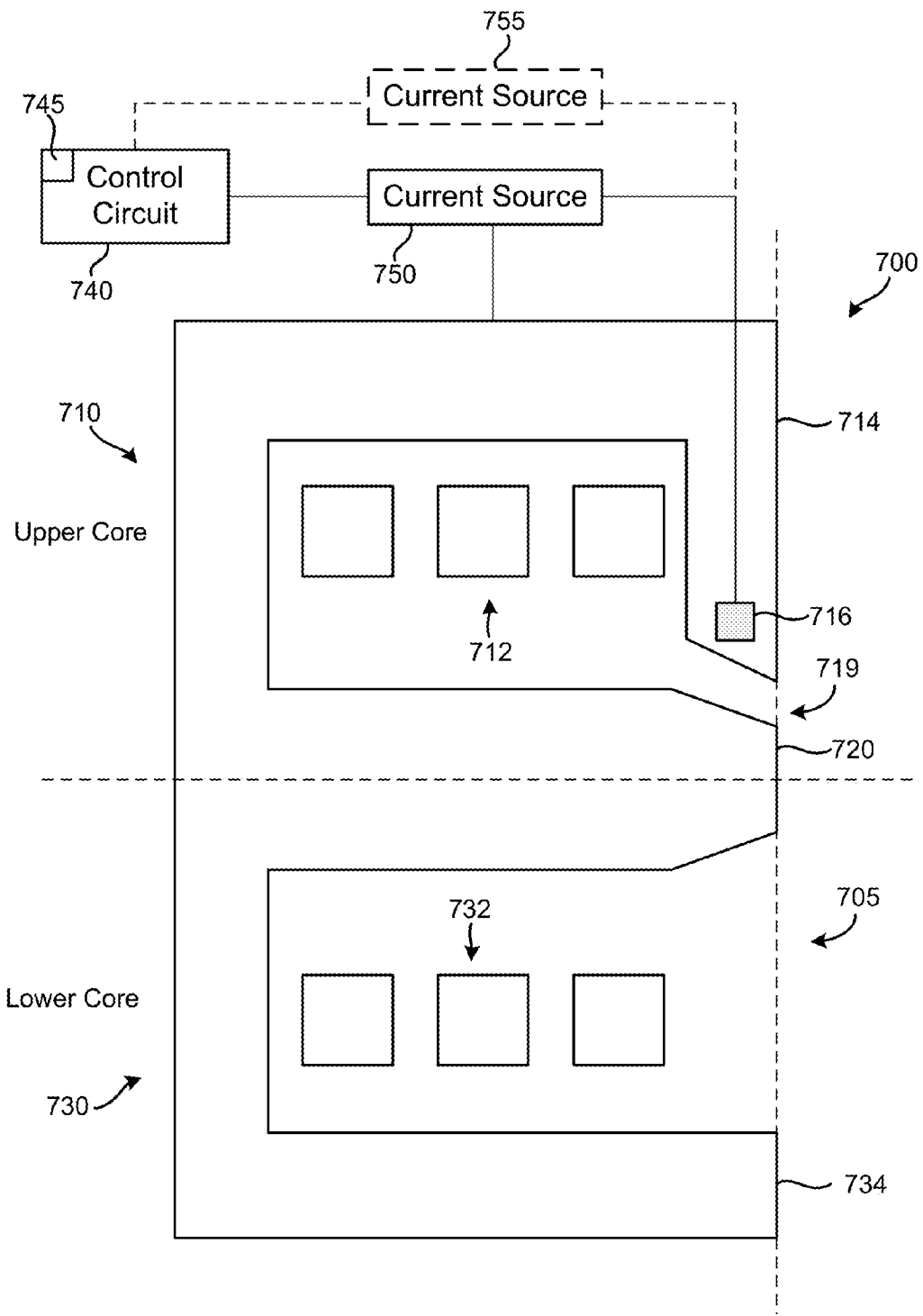
FIG. 7 is a sectional view of a writer core of a transducer that incorporates a thermal sensor and circuitry that controllably powers the writer core and thermal sensor in accordance with various embodiments.

In accordance with various embodiments, and with reference to FIG. 7, a thermal sensor 716 may be incorporated within the upper core 710 of a writer core 700 and operate as a multiple-purpose component of the transducer. FIG. 7 is a sectional view of a writer core 700 of a transducer that incorporates a thermal sensor 716 and circuitry 745/750/755 that controllably powers the writer core 700 and thermal sensor 716 in accordance with various embodiments. In one mode of operation, the thermal sensor 716 serves as a temperature sensor similar to those described previously with regard to FIGS. 5 and 6. In another mode of operation, the thermal sensor 716 operates cooperatively with the writer pole 720 to amplify and contain a magnetic field during write operations to enhance transition sharpness. During write operations, the magnetic response of the writer pole 720 and the return shield 714 (and optionally the return shield 734) is actively synchronized using thermal sensor 716. When operating as a thermal sensor, the thermal sensor 716 is supplied a relatively low current, such as that identified hereinabove. When used during write operations, the thermal sensor 716 is supplied a relatively high current, such as that identified hereinabove.

FIG. 7 is a sectional view of a writer core 700 which incorporates a thermal sensor within or inside a shield of the writer core 700 in accordance with various embodiments. It is understood that embodiments incorporating a multi-purpose thermal sensor 716 can locate the thermal sensor 716 in a spaced-apart relationship with respect to the return shield 714, such as is shown and described with regard to the embodiment shown in FIGS. 5-6. According to the embodiment shown in FIG. 7, the writer core 700 is a component of a transducer configured to interact with a magnetic recording medium, and includes an upper core portion 710 and a lower core portion 730. The upper core 710 includes coils 712 and a upper return shield 714, and the lower core 730 includes coils 732 and a lower return shield 734. The upper core 710 is situated closer than the lower core 730 to the trailing edge of the transducer according to some embodiments. A writer pole 720 is situated between the upper and lower cores 710 and 730.

In the embodiment shown in FIG. 7, the thermal sensor 716 is situated within or inside the return shield 714 of the upper core 710 of the writer core 700. More particularly, the thermal sensor 716 is situated within or inside a distal end of the return shield 714 proximate the gap 719. Because the return shield 714 is situated at or near the ABS 705 and near the writer close point, the temperature and temperature changes of the thermal sensor 716 are the same or about the same as that experienced by the return shield 714 and the writer close point.

According to some embodiments, the writer core 700 is implemented as a compact core. Compact cores demonstrate performance benefits in response to a reduced write field rise time (that is, how fast the writer pole responds to a change in direction of the coil field). Writer coils 712 and 732, for example, may be implemented close to the ABS 705 for purposes of reducing write field rise time. However, changing write field rise time does not necessarily affect gradient rise time (that is, how quickly the writer structure can achieve an ideal gradient). The write field is determined mostly by a writer pole 720, but the gradient depends on the response of the writer structure. The gradient rise time is typically much slower than the write field rise time, and depends not only on the writer pole speed, but also on how fast the return shield(s) can close the flux circuit to establish the write field gradient. Compact core designs, however, demonstrate substantial risk of side track erasure (that is, writing to adjacent tracks).

In accordance with the writer core embodiment illustrated in FIG. 7, the coil arrangement 712, 732 generates a magnetic field that is energized and field amplified by a thermal sensor 716 positioned in the vicinity of the writer pole 720. The thermal sensor 716, which may be implemented as a wire formed of a material having a thermal coefficient of resistance, can generate large local magnetic fields by way of relatively large current densities in the wire. The field profile from the thermal sensor wire 716 maps onto that of the writer pole 720 to yield enhanced field gradients. The thermal sensor 716 is energized using a current flowing in the direction opposite to current flowing in the writer core coils 712 and 732. This current generates a magnetic field to actively synchronize the magnetic response of the writer pole 720 with the return shield 714 and/or other shield(s) (e.g., return shield 734 during write operations.

The magnetic field can be confined in the cross-track direction using the magnetic shields of the writer core 700 and/or field cancellation using other magnetic fields generated at the writer core 700. In addition, a higher current density in the thermal sensor wire 716 may be used to produce a strong side field with polarity opposite that of the writer pole 720. This effect, in combination with the soft magnetic material of the shields, results in reduced side effects, good cross-track field confinement, and shielding adjacent tracks. Because the shields can also act as heat sinks for the thermal sensor wire 716, the magnetic material of the shield should have good thermal properties.

The materials used to manufacture the thermal sensor wire 716 may include any of a wide variety of conventional electrical conductors that have a TCR. In general, materials having a relatively high TCR provide for enhanced temperature and temperature change sensing by the thermal sensor wire 716. However, materials having a relatively low TCR can provide sufficient temperature sensing resolution in embodiments of a multi-purpose temperature sensor 716. Suitable materials for fabricating the thermal sensor wire 716 include, but are not limited, metals such as Pt, Ru, Cu, Au, Al, W, Ni, NiFe, and Mo. Other non-metal materials may also be used, such as carbon nanotubes, indium tin oxide (ITO), Poly(3,4-ethylenedioxythiophene) (PEDOT), poly(styrene sulfonate) PSS, and graphene. In some embodiments, the material may be selected to have a small coefficient of thermal expansion so that the size can be contained even when heat is generated by the current flowing through the thermal sensor 716.

The current supplied to the thermal sensor 716 can be similar to that provided to the writer core coils 712 and 732, or may be different (e.g., different waveform and/or different magnitude). Heat generated at high-current densities can be dissipated through the cooling power available at the ABS 705 for a transducer in flight. This cooling power is already coupled with the transducer head due to the large surface area of the recording media relative to the transducer. The thermal sensor 716 can be energized using any suitable source, including but not limited to a current source 750. In one illustrative example, the thermal sensor 716 is energized by the same current source 750 used to energize the writer core coils 712 and 732. In another illustrative example, current in the thermal sensor 716 can be driven independently of the writer core coils 712 and 732, such as by a second current source 755. In such an implementation, the current source 755 is used to establish a current in the thermal sensor 716 independent of the current being provided to the writer core coils 712 and 732 by current source 750. Using an independent current source 755 enables properties of the current (e.g., waveform, amplitude, and phase) to be "fine-tuned" for the thermal sensor 716, for example, based on operating conditions and a feedback loop.

FIG. 7 further shows a control circuit 740 configured to actively synchronize a magnetic response of the writer pole 720 and the shield(s) 714/732 in accordance with various embodiments. In one illustrative implementation, actively synchronizing a magnetic response of a writer pole 720 and shield 714 is performed by control circuit 740 located off of the transducer to energize one or more writer coils 712/732. In another illustrative implementation, the control circuit 740 is located on or within the transducer. Combinations of off-transducer and on-transducer control circuitry may also be employed. The control circuit 740 includes or is coupled to an energizing source, which may be the current source 750, current source 755 or other current source. The control circuit 740 may include a sensor module 745 configured to receive input from the thermal sensor wire 716 and/or the electromagnetic field being generated by the thermal sensor wire 716. The sensor module 745 of the control circuit 740 can also receive input from other sources. Input received by the sensor module 745 is processed and used to make adjustments to the output of the current source(s) 750/755. For example, the input at sensor module 745 may be used for phase adjustment, amplitude adjustment, and/or waveform adjustment of the current signal.

Figure 8:
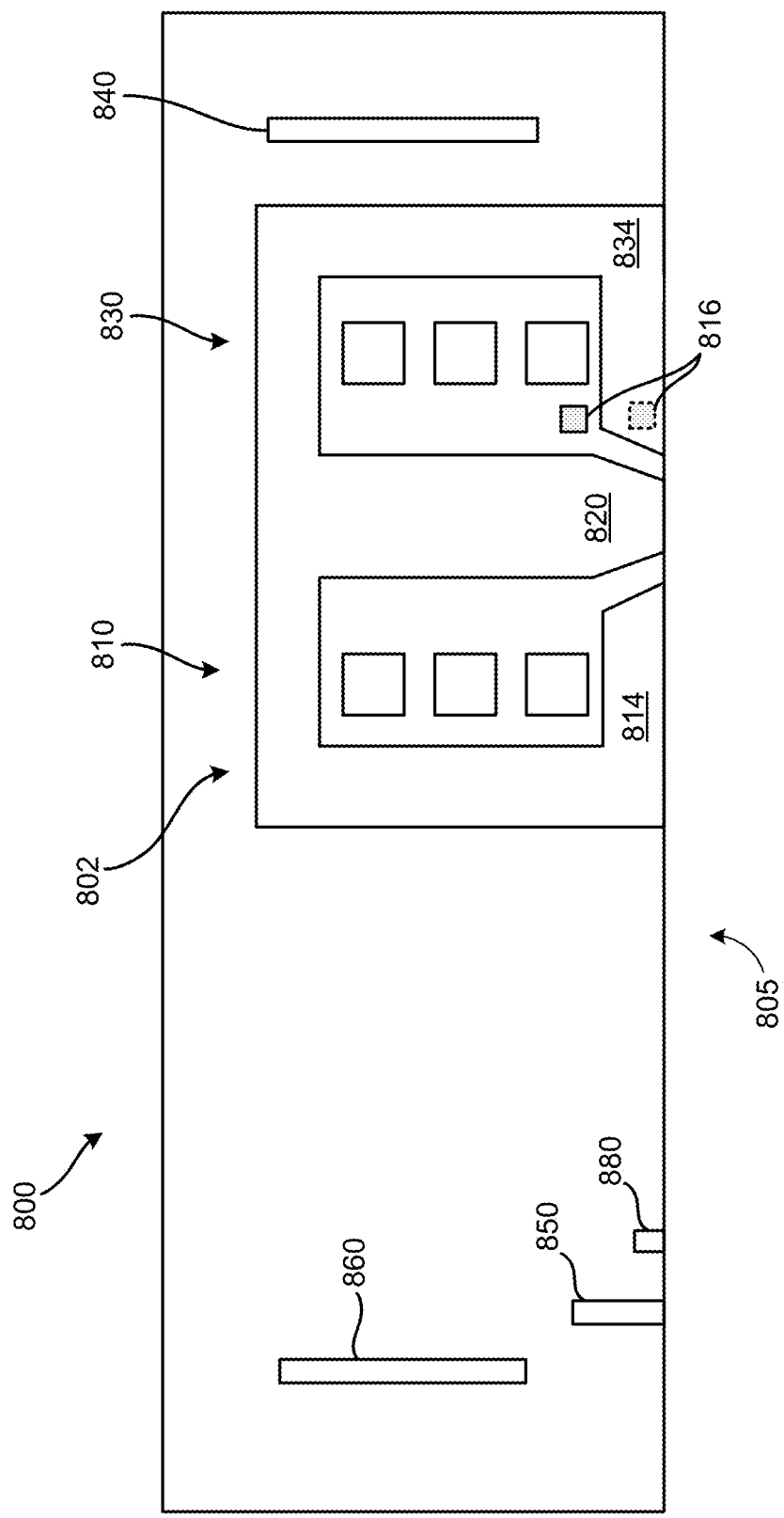
FIG. 8 illustrates a recording transducer which includes a multiplicity of thermal sensors in accordance with various embodiments.

In accordance with various embodiments, and with reference to FIG. 8, a recording transducer 800 is shown to include a multiplicity of thermal sensors 816 and 880. The recording transducer 800 includes a number of other components, including a writer 802 (which includes an upper writer core 810 and a lower writer core 830), a writer heater 840 thermally coupled to the writer 802, a reader 850, and a reader heater 860 thermally coupled to the reader 850. The writer 802 and reader 850 are positioned at or near an ABS 805 of the transducer 800. Thermal actuation of the writer heater 840 causes thermal expansion of the writer region of the transducer 800, resulting in reduced spacing between the writer 802 and an adjacent magnetic recording medium. Actuation of the reader heater 860 causes thermal expansion of the reader region of the transducer 800, resulting in reduced spacing between the reader 850 and the adjacent magnetic recording medium. Thermal actuation of the writer and reader regions of the transducer 800 causes the writer and reader thermal sensors 816 and 880 to become situated at or extremely close to the writer and reader close points, respectively. The writer and reader heaters 840, 860 and the thermal sensors 816, 880 can be selectively activated to control head-media spacing in a data storage system.

According to the embodiment of FIG. 8, the transducer 800 incorporates a thermal sensor 816 within a writer core 802, and a thermal sensor 880 situated at or near the ABS 805 adjacent a reader 850 of the transducer 800. The thermal sensor 880 adjacent the reader 850 is configured to sense for temperature and temperature changes at the reader region of the transducer 800. As discussed previously, the thermal sensor 816 is configured to sense for temperature and temperature changes at the writer region of the transducer 800. The thermal sensors 880 and 816 can be of the same or different technology. For example, each of the thermal sensor 880 and 816 can be fabricated with material having a TCR.

In some embodiments, the thermal sensor 816 is situated within an upper core 810 of the writer core 802 at a location spaced apart from a return shield 814 of the writer core 802. In other embodiments, the thermal sensor 816 is situated within or inside the return shield 814 of the upper writer core 810. In such embodiments, the thermal sensor 816 can be configured to operate in multiple modes, including a temperature sensing mode (e.g., for spacing change and contact detection) and a mode for enhancing or optimizing the magnetic field gradient when writing data to a magnetic recording medium. Bias power can be supplied to the thermal sensor 880 adjacent the reader 850 by the same or a different source that supplies bias power to the thermal sensor 816 within the writer 802. In accordance with embodiments in which the thermal sensor 816 is a multiple-purpose component, the thermal sensor 816 is supplied bias power from a source capable of supplying relatively high current needed for enhancing or optimizing the magnetic field gradient during data writing operations.

The thermal sensors 816 and 880 can be connected to separate power sources or the same power source. In some embodiments, the thermal sensors 816 and 880 can be connected in series. In other embodiments, thermal sensors 816 and 880 can be connected in parallel, such as via a ground-split connection approach as previously described. Although the thermal sensors 816 and 880 can be connected to separate power sources, connecting the thermal sensors 816 and 880 in series or parallel provides for a reduction in the number of transducer bond pads needed for these components. It is understood in the art that adding bond pads (e.g., a current source contact, a voltage source contact, ground contact) to a transducer can require an extensive and expensive re-design of the transducer, adding cost and fabrication complexity.

According to some embodiments, the temperature profile of the transducer 800 can be represented as a steady state DC signal generated by the thermal sensors 816 and 880. In other embodiments, the temperature profile of the transducer 800 can be represented as an AC signal generated by the thermal sensor 816, such as in response to modulation of the heater power for example. When the transducer 800 is actuated by one or both of thermal actuators 840 and 860, the transducer surface temperature will increase with the actuation due to the generated heat. The transducer temperature will be higher than the temperature of the adjacent recording medium, causing the recording medium to act as a heat sink. When the transducer 800 contacts the recording medium, the transducer surface temperature will drop due to a change in heat transfer rate resulting from the contact. The transducer surface temperature will continue to increase due to thermal actuator heating and frictional heating. The change in temperature or excursion in temperature trajectory sensed by the thermal sensors 816 and 880 can be used to declare a head-media contact event at one or both of the writer and reader regions of the transducer 800.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
   a writer core of a transducer, the writer core configured to interact with a magnetic recording medium and comprising an upper core and a lower core;
   at least one of the upper and lower cores comprising a return pole having a return shield;
   a writer pole between the upper and lower cores;
   a writer gap defined between the writer pole and the return shield; and
   a sensor element within one of the upper and lower cores that includes the return shield and the writer gap, the sensor element situated at or near the return shield such that a change in temperature experienced by the sensor element is the same or substantially the same as that experienced by the return shield, the sensor element having a temperature coefficient of resistance and configured to sense for a change in temperature indicative of one or both of a change in spacing and contact between the transducer and the magnetic recording medium.

2. The apparatus of claim 1, wherein the sensor element is spaced apart from the return shield.

3. The apparatus of claim 1, wherein the sensor element is integral to the return shield.

4. The apparatus of claim 1, wherein the sensor element is at or near a distal end of the return shield proximate the writer gap.

5. The apparatus of claim 1, wherein:
   a portion of the return shield is at or near an airbearing surface of the transducer; and
   the sensor element is spaced apart from the return shield portion and away from the airbearing surface.

6. The apparatus of claim 1, wherein:
   the apparatus comprises a leading edge and a trailing edge; and
   the upper core is situated more closely to the trailing edge than the lower core.

7. The apparatus of claim 1, further comprising a reader of the transducer, wherein:
   the reader is situated more closely to the lower core than the upper core; and
   the upper core comprises the return shield.

8. The apparatus of claim 1, wherein:
   the sensor element is spaced apart from the return shield; and
   the spacing between the sensor element and the return shield allows for a change in temperature at the return shield resulting from one or both of the spacing change and contact to be sensed by the sensor element.

9. The apparatus of claim 1, wherein:
   the sensor element is spaced apart from the return shield; and
   the spacing between the sensor element and the return shield is such that a change in temperature experienced by the thermal sensor is the same or substantially the same as that experienced by the return shield.

10. The apparatus of claim 1, wherein the apparatus comprises a writer heater proximate the writer core and configured to thermally activate at least the writer pole, the return shield, and the sensor element.

11. The apparatus of claim 1, wherein the writer core further comprises a spacer between the thermal sensor and the return shield, the spacer comprising a material having a temperature coefficient of resistance.

12. The apparatus of claim 1, wherein the sensor element is separated from the writer pole by less than about 300 nm.

13. The apparatus of claim 1, wherein the sensor element is configured to sense one or both of a change in modulation of transducer-media spacing during flight and a change in thermal conductivities.

14. An apparatus, comprising:
   a writer core of a transducer, the writer core configured to interact with a magnetic recording medium and comprising an upper core and a lower core;
   at least one of the upper and lower cores comprising a return pole having a return shield;
   a writer pole between the upper and lower cores;
   a writer gap defined between the writer pole and the return shield; and
   a sensor element within one of the upper and lower cores that includes the writer gap and the return shield, the sensor element situated at or near the return shield such that a change in temperature experienced by the sensor element is the same or substantially the same as that experienced by the return shield, the sensor element having a temperature coefficient of resistance and configured to:
      sense for a change in temperature indicative of one or both of a change in spacing and contact between the transducer and the magnetic recording medium; and
      enhance a gradient of a magnetic field generated by the write core.

15. The apparatus of claim 14, wherein the temperature sensor is integral to the return shield.

16. The apparatus of claim 14, wherein the sensor element is configured to:
   sense, in a first mode, for the change in temperature indicative of one or both of the change in spacing and contact between the transducer and the magnetic recording medium;

enhance, in a second mode, the magnetic field generated by the write core; and the first and second modes are separated in time.

17. The apparatus of claim 14, comprising circuitry coupled to the writer core and configured to actively synchronize magnetic responses of the write pole and the return shield during write operations.

* * * * *